United States Patent
Yoo et al.

(10) Patent No.: US 10,511,360 B2
(45) Date of Patent: Dec. 17, 2019

(54) METHOD AND APPARATUS FOR ESTIMATING CHANNEL IN COMMUNICATION SYSTEM SUPPORTING MIMO-BASED BEAMFORMING

(71) Applicant: Samsung Electronics Co., Ltd., Suwon-si, Gyeonggi-do (KR)

(72) Inventors: Hyun-Il Yoo, Suwon-si (KR); Tae-Young Kim, Seongnam-si (KR); Jee-Hwan Noh, Suwon-si (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 15/578,045

(22) PCT Filed: May 27, 2016

(86) PCT No.: PCT/KR2016/005654
§ 371 (c)(1),
(2) Date: Nov. 29, 2017

(87) PCT Pub. No.: WO2016/195334
PCT Pub. Date: Dec. 8, 2016

(65) Prior Publication Data
US 2018/0152222 A1    May 31, 2018

(30) Foreign Application Priority Data

May 29, 2015  (KR) .......................... 10-2015-0076086

(51) Int. Cl.
*H04B 7/04*     (2017.01)
*H04B 7/0426*   (2017.01)
(Continued)

(52) U.S. Cl.
CPC ........... *H04B 7/043* (2013.01); *H04B 7/0456* (2013.01); *H04B 7/0695* (2013.01); *H04B 7/088* (2013.01);
(Continued)

(58) Field of Classification Search
CPC . H04L 25/0216; H04L 25/0226; H04B 7/043; H04B 7/0456; H04B 7/08; H04B 7/06; H04B 7/04; H04W 24/10
See application file for complete search history.

(56) References Cited

U.S. PATENT DOCUMENTS

2009/0291702 A1\* 11/2009 Imai .................... H04B 7/0417
                                                                 455/517
2013/0089000 A1    4/2013 Hansen et al.
(Continued)

FOREIGN PATENT DOCUMENTS

KR   10-2014-0131056 A   11/2014
WO   2014074894 A1       5/2014

OTHER PUBLICATIONS

ISA/KR, "International Search Report," Application No. PCT/KR2016/005654, dated Aug. 26, 2016, 3 pages.
(Continued)

*Primary Examiner* — Lan-Huong Truong

(57) ABSTRACT

The present disclosure relates to a 5G or pre-5G communication system for supporting a higher data transmission rate than a 4G communication system such as LTE. The present disclosure relates to a method for a transmission end to estimate a channel in a communication system supporting multiple input multiple output (MIMO)-based beamforming, the method comprising: a step of obtaining a candidate channel estimate of each of a plurality of candidate beam combinations by means of a channel estimation section corresponding to each of the plurality of candidate beam combinations, the combinations consisting of at least one
(Continued)

transmission beam and at least one reception beam from among transmission beams of the transmission end and reception beams of a reception end, wherein the channel estimation section corresponding to each of the plurality of candidate beam combinations comprises a serving channel estimation section corresponding to a serving beam combination of the transmission end and the reception end, a channel gain estimation section of one candidate beam combination of the plurality of candidate beam combinations, and a channel estimation section of the candidate beam combination; and a step of obtaining an optimal channel estimation value of the transmission end and the reception end on the basis of the obtained candidate channel estimates.

15 Claims, 14 Drawing Sheets

(51) Int. Cl.
    *H04B 7/0456*     (2017.01)
    *H04L 25/02*     (2006.01)
    *H04B 7/06*     (2006.01)
    *H04B 7/08*     (2006.01)
    *H04B 7/0413*     (2017.01)

(52) U.S. Cl.
    CPC ...... *H04L 25/0204* (2013.01); *H04L 25/0216* (2013.01); *H04L 25/0226* (2013.01); *H04B 7/0413* (2013.01)

(56) References Cited

U.S. PATENT DOCUMENTS

2013/0315325 A1    11/2013    Wang et al.
2014/0187168 A1*    7/2014    Seol ..................... H04B 7/0617
                                                                  455/63.4
2014/0198681 A1    7/2014    Jung et al.
2014/0328266 A1    11/2014    Yu et al.

OTHER PUBLICATIONS

ISA/KR, "Written Opinion of the International Searching Authority," Application No. PCT/KR2016/005654, dated Aug. 26, 2016, 5 pages.

* cited by examiner

| Field | Size | | Meaning |
|---|---|---|---|
| Channel Measurement | Channel Measurement 1 | $N_{taps}$ x 16 bits | Channel Measurement for the first TRN-T field |
| | Channel Measurement 2 | $N_{taps}$ x 16 bits | Channel Measurement for the second TRN-T field |
| | ⋮ | | |
| | Channel Measurement $N_{meas}$ | $N_{taps}$ x 16 bits | Channel Measurement for the $N_{meas}$ TRN-T field |
| Tap Delay | Relative Delay Tap #1 | 8 bits | The delay of Tap #1 in units of Tc relative to the path with the shortest delay detected |
| | Relative Delay Tap #2 | 8 bits | The delay of Tap #2 in units of Tc relative to the path with the shortest delay detected |
| | ⋮ | | |
| | Relative Delay Tap #$N_{taps}$ | 8 bits | The delay of Tap #N in units of Tc relative to the path with the shortest delay detected |
| Sector ID Order | Sector $ID_1$ | 6 bits | Sector ID for $SNR_1$ being obtained, or sector ID of the first detected beam |
| | Antenna $ID_1$ | 2 bits | Antenna ID corresponding to Sector $ID_1$ |
| | Sector $ID_2$ | 6 bits | Sector ID for $SNR_2$ being obtained, or sector ID of the second detected beam |
| | Antenna $ID_2$ | 2 bits | Antenna ID corresponding to Sector $ID_2$ |
| | ⋮ | | |
| | Sector $ID_{N_{meas}}$ or Sector $ID_{N_{beam}}$ | 6 bits | Sector ID for $SNR_{N_{meas}}$ being obtained, or sector ID of the detected beam $N_{beam}$ |
| | Antenna $ID_{N_{meas}}$ or Antenna $ID_{N_{beam}}$ | 2 bits | Antenna ID corresponding to Sector $ID_{N_{meas}}$ or Sector $ID_{N_{beam}}$ |

FIG.9

METHOD AND APPARATUS FOR ESTIMATING CHANNEL IN COMMUNICATION SYSTEM SUPPORTING MIMO-BASED BEAMFORMING

CROSS-REFERENCE TO RELATED APPLICATIONS AND CLAIM OF PRIORITY

The present application claims priority under 35 U.S.C. § 365 and is a 371 National Stage of International Application No. PCT/KR2016/005654 filed on May 27, 2016, which claims the benefit of Korean Patent Application No. 10-2015-0076086 filed on May 29, 2015, the disclosures of which are fully incorporated herein by reference into the present disclosure as if fully set forth herein.

TECHNICAL FIELD

The present disclosure relates to a method and an apparatus for estimating a channel in a communication system supporting Multiple-Input Multiple-Output (MIMO)-based beamforming.

BACKGROUND ART

In order to meet wireless data traffic demands, which have increased since the commercialization of a 4th-Generation (4G) communication system, efforts to develop an improved 5th-Gneration (5G) communication system or a pre-5G communication system have been made. For this reason, the 5G communication system or the pre-5G communication system is called a beyond-4G-network communication system or a post-LTE system.

In order to achieve a high data transmission rate, implementation of the 5G communication system in an mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna technologies are being discussed to mitigate propagation path loss in the mmWave band and increase propagation transmission distance.

Further, technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non-Orthogonal Multiple Access (NOMA), and Sparse Code Multiple Access (SCMA).

In IEEE 802.11ad, which is the standard of a WLAN system, which is one of the systems implemented in the mmWave band, data is transmitted and received through a Single-Input Single-Output (SISO)-based transmission method using a broadband and beamforming in the mmWave. Accordingly, in order to apply the current standard of IEEE 802.11ad to future pre-5G or post-11ad standards, methods of supporting Multiple-Input Multiple-Output (MIMO)-based communication are required in an IEEE 802.11ad-based system.

SUMMARY

The present disclosure proposes a method and an apparatus for estimating a channel in a communication system supporting MIMO-based beamforming.

A method of estimating a channel by a transmission side in a communication system supporting Multiple-Input Multiple-Output (MIMO)-based beamforming in accordance with an embodiment of the present disclosure includes: acquiring a candidate channel estimation value of each of a plurality of candidate beam combinations including at least one transmission beam and at least one reception beam among transmission beams of the transmission side and reception beams of a reception side, wherein a channel estimation interval corresponding to each of the plurality of candidate beam combinations includes a serving channel estimation interval corresponding to a service beam combination of the transmission side and the reception side, a channel gain estimation interval of one of the plurality of candidate beam combinations, and a channel estimation interval of the candidate beam combination; and acquiring an optimal channel estimation value of the transmission side and the reception side based on the acquired candidate channel estimation values.

A transmission side for estimating a channel in a communication system supporting Multiple-Input Multiple-Output (MIMO)-based beamforming in accordance with another aspect of the present disclosure includes: a first channel estimation unit that acquires a candidate channel estimation value of each of a plurality of candidate beam combinations including at least one transmission beam and at least one reception beam among transmission beams of the transmission side and reception beams of a reception side, wherein a channel estimation interval corresponding to each of the plurality of candidate beam combinations includes a serving channel estimation interval corresponding to a service beam combination of the transmission side and the reception side, a channel gain estimation interval of one of the plurality of candidate beam combinations, and a channel estimation interval of the candidate beam combination; and a second channel estimation unit that acquires an optimal channel estimation value of the transmission side and the reception side based on the acquired candidate channel estimation values.

According to the present disclosure, it is possible to reduce overhead of a beam change by estimating a channel in a communication system that supports MIMO-based beamforming through expansion of a training (TRN) structure of a SISO-based communication system according to an embodiment, and to minimize quantization noise for each beam by applying different Automatic Gain Control (AGC) gains according to a channel estimation, thereby maximizing the channel estimation performance to thus maximize the performance of channel capacity measurement. As a result, a beam optimized for MIMO transmission can be selected.

Further, it is possible to transmit feedback information based on the existing SISO-based channel measurement information because a relative channel estimation value between a serving channel and a candidate channel is acquired according to an embodiment.

BRIEF DESCRIPTION OF THE DRAWINGS

FIG. 9 illustrates an example of channel measurement feedback information used in the SISO-based communication system;

DETAILED DESCRIPTION

Figure 1:
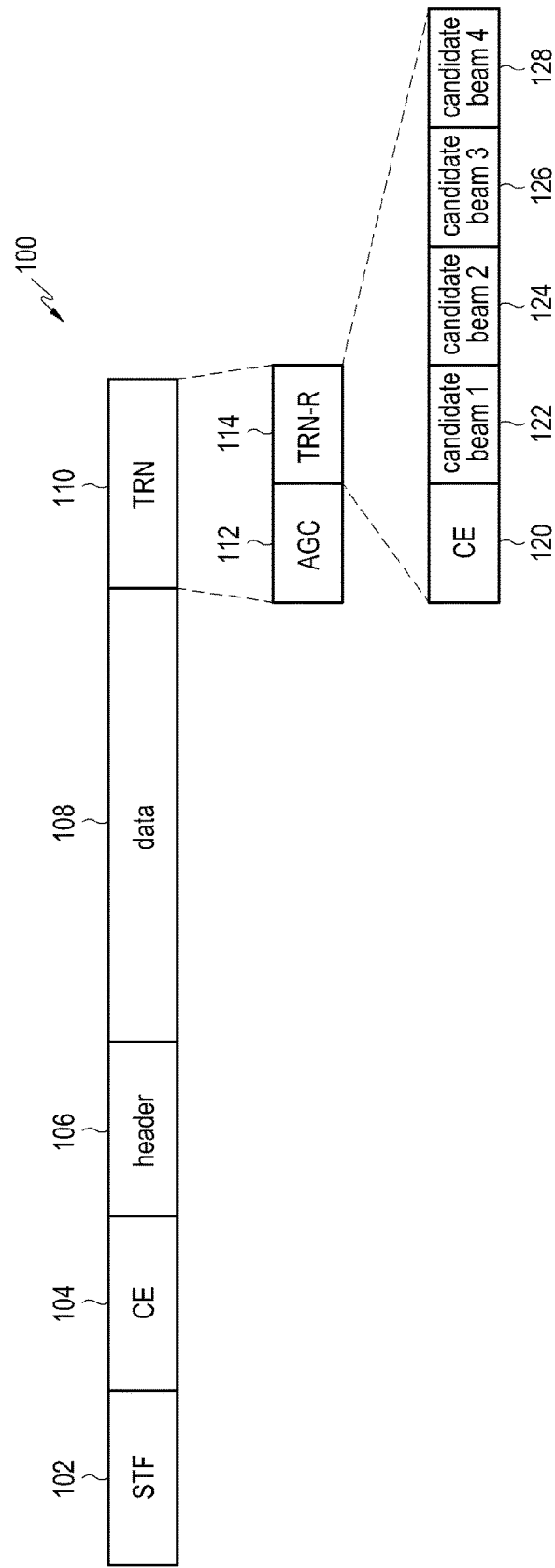
FIG. 1 illustrates an example of the structure of a packet used in a SISO-based communication system.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms may vary according to the intention of a user or operator, convention, or the like. Therefore, the definitions of the terms should be made based on the contents throughout the specification.

Hereinafter, an embodiment of the present disclosure proposes a training (TRN) structure to be used in a MIMO beam selection process to apply Multiple-Input Multiple-Output (MIMO) to a Single-Input Single-Output (SISO)-based communication system. This specification is described based on an SISO-based communication system, for example, an IEEE 802.11ad-based system.

FIG. 1 illustrates an example of a packet structure used in an SISO-based communication system.

Referring to FIG. 1, a packet 100 includes a Short Training Field (STF) 102, a Channel Estimation (CE) field 104, a header 106, data 108, and a training (TRN) field 110. The STF 102 is a field for acquiring time and frequency synchronization, and the CE field 104 is a field for channel estimation. The TRN field 110 is a field for performing beam refinement, and includes an Automatic Gain Control (AGC) interval 112 for measuring beam-specific reception power and an interval for training a transmission beam or a reception beam. For example, it is assumed that the packet 100 includes an interval (TRN-R) 114 for reception beam training. In this case, the TRN-R 114 includes, for example, a CE field 120 and TRN subfields 122 to 128 for performing beam training on each of a total of four candidate beams (candidate beams #1 to #4) for reception beam training. According to another embodiment, the TRN field 110 of the packet 100 may include an interval (TRN-T) for transmission beam training.

Figure 2:
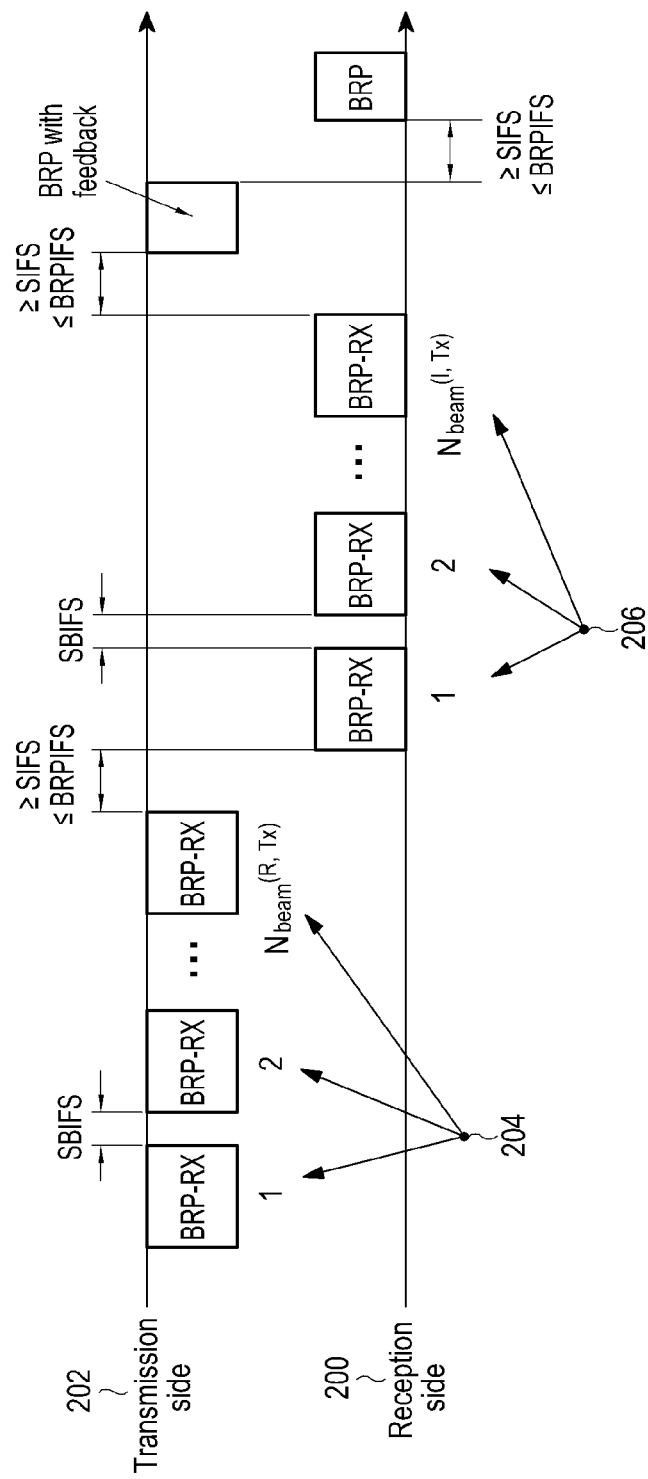
FIG. 2 illustrates an example of an operation for performing beam training using a TRN field included in the packet structure of FIG. 1.

FIG. 2 illustrates an example of an operation for performing beam training through the TRN field included in the packet structure of FIG. 1. For convenience of description, the operation of FIG. 2 is an example of an operation for performing beam training on the reception beam, but may be equally applied to an operation for performing beam training on the transmission beam.

Referring to FIG. 2, a beam-training procedure for realizing an optimal reception beam may be first performed for a reception side 202. In this case, a transmission side 200 transmits N beam-training signals, corresponding to the total number of reception beams of the reception side 202, through currently set transmission beams in step 204. Then, the reception side 202 may measure the received signal magnitude for the beam-training signals, which the transmission side 200 has transmitted, received through the corresponding beams in a Beam Refinement Protocol (BRP)-Reception (RX) interval corresponding to each reception beam, and may determine a beam-training signal having the maximum received signal magnitude as an optimal reception beam. At this time, BRP-RXs are received at predetermined time intervals, that is, Short Beamforming Inter-Frame Space (SBIFS) intervals. When a predetermined time interval passes after the reception side 200 receives the beam-training signal through reception beam N, which is the last reception beam, a beam-training procedure for determining an optimal reception beam for the transmission side 200 is performed. Herein, the predetermined time interval for reception beam training of the transmission side 200 after reception beam training of the reception side 202 may be set within a range that is larger than or equal to Short Inter-Frame Spacing (SIFS) or equal to or smaller than Beam Refinement Protocol Inter-Frame Spacing (BRPIFS). When the beam training for the reception beam is completed, the reception side 202 may transmit information indicating completion of the beam training.

In order to determine the optimal reception beam for the transmission side 200, the reception side 202 transmits N beam-training signals, corresponding to a total number of reception beams of the transmission side 200, in step 206. Similarly, the transmission side 200 may also measure the received signal magnitude for beam-training signals, which the reception side 202 has transmitted, received through the corresponding reception beams in a BRP-RX interval corresponding to each reception beam, and may determine the reception beam through which a beam-training signal having the maximum received signal magnitude is received as an optimal reception beam. Further, when the beam training for the reception beam is completed, the transmission side 200 may transmit information indicating completion of the beam training.

As illustrated in FIG. 2, the SISO-based beam-training procedure is sequentially performed on transmission beams or reception beams. Accordingly, in the structure of FIG. 2, it is difficult to simultaneously perform transmission and reception training on a MIMO channel having a rank.

Figure 3:
FIG. 3 illustrates an example of one-shot beamforming training in which transmission beamforming and reception beamforming can be generally performed at the same time.

FIG. 3 illustrates an example of one-shot beamforming training in which transmission beamforming and reception beamforming can be generally performed at the same time.

Referring FIG. 3, a reception side 300 may receive beam-training signals transmitted from respective transmission beams of the transmission side 302 in BRP intervals 304 in which currently set reception beams (beam indexes 1 to NI) are mapped to each of a total of transmission beams (beam indexes 1 to NR) in 1:1 correspondence, measure the received power magnitude for each of the beam-training signals, and determine the transmission beam and the reception beam having the maximum value as an optimal transmission beam and an optimal reception beam.

Because the above-described one-shot beamforming procedure requires a beam-training procedure for all beam combinations that may be configured by beams of each of the transmission side and the reception side, there may be a problem of increasing complexity.

Figure 4:
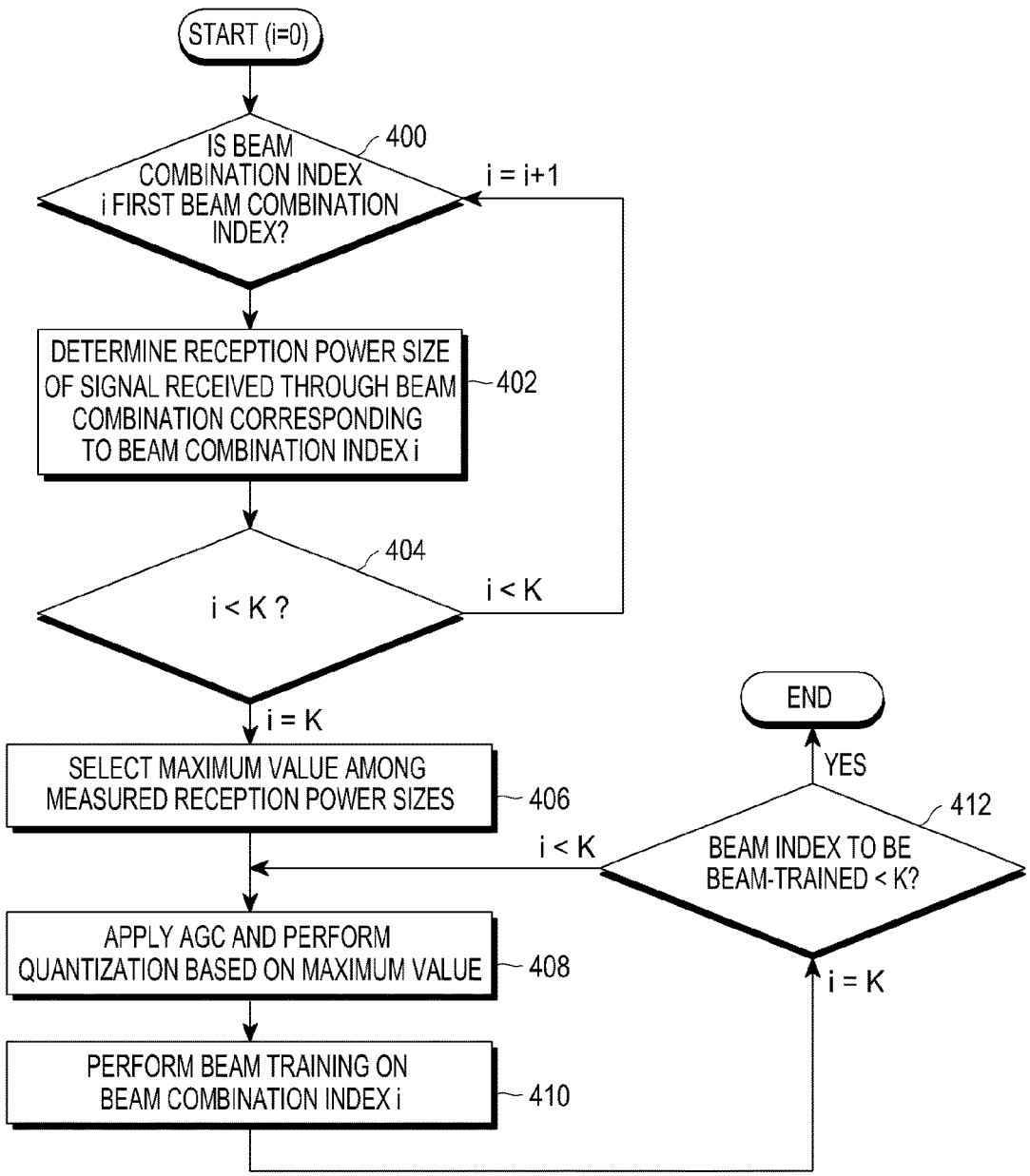
FIG. 4 is an example of a flowchart illustrating an AGC operation performed for beam training in a TRN field of a packet used in an SISO-based communication system.

FIG. 4 is an example of a flowchart illustrating an AGC operation performed for beam training in a TRN field of a packet used in an SISO-based communication system. For convenience of description, although FIG. 4 illustrates the case in which the transmission side determines an optimal reception beam, FIG. 4 may be equally applied to the case in which an optimal transmission beam is determined. Similarly, FIG. 4 may be equally applied to the case in which the reception side determines the optimal transmission beam and the optimal reception beam.

Referring to FIG. 4, in step 400, the transmission side identifies beam combination index i for beam training. Here, it is assumed that the number of all beam combinations that can be configured by one transmission beam and one reception beam is K, and i indicates a beam combination index. In step 402, the transmission side determines the received power magnitude (P) of a received signal through a beam combination corresponding to beam combination index i based on Equation (1) below.

$$P_i[n] = P_i[n-1] + |y_i[n]|^2 - |y_i[n - L_{AGC}]|^2 \quad \text{Equation (1)}$$

In Equation (1), it is assumed that the reception signal received through the corresponding beam combination includes a total of N samples, n indicating a sample index. Further, Pi[n] denotes reception power for an nth sample included in the signal received through the beam combination corresponding to beam combination index i, Yi[n] denotes an nth sample received through the beam combination corresponding to beam combination index i, and LAGC denotes a window for measuring the received power magnitude. According to the present embodiment, the received power magnitude of the signal received from the corresponding beam combination for each of all beam combinations for beam training in the TRN interval is determined based on Equation (1) above. Accordingly, in step 404, the transmission side identifies whether beam combination index i is the same as K, which is the number of all beam combinations. When i is smaller than K based on the result of the identification, steps 400 to 404 are repeated. When i is equal to K based on the result of the identification, the transmission side selects a maximum value from received power sizes calculated for all beam combinations based on Equation (2) below in step 406.

$$P\max = \arg\max_i P_i \quad \text{Equation (2)}$$

In step 408, the transmission side calculates an AGC gain through Equation (3) below based on the maximum value of the received power magnitude acquired through Equation (2) above.

$$G_{AGC}[t] = G_{AGC}[t-1] + \Delta G \quad \text{Equation (3)}$$

In Equation (3), GAGC[t] denotes an AGC gain in a tth packet. ΔG is calculated through Equation (4) below.

$$\Delta G = G_{pre} - 10\log_{10}(P\max) \quad \text{Equation (4)}$$

In Equation (4), Gpre denotes a reference of a predetermined gain. Further, when the AGC gain of the corresponding packet is determined based on Equations (2) to (4), quantization shown in Equation (5) below may be performed by applying the determined AGC gain to the TRN structure for the transmission beam or the reception beam of the corresponding packet.

$$\hat{y} = Q(y) \quad \text{Equation (5)}$$

In Equation (5), Q(•) denotes a quantization function of q bits.

In step 410, the transmission side performs beam training on a quantized signal acquired based on Equation (5). That is, the transmission side measures the received power magnitude of the quantized signal and estimates a beam corresponding to a beam index corresponding to the received power magnitude, measured according to Equation (6) below, as an SISO-based optimal beam.

$$\text{beam\_idx} = \arg\max_i P_i \quad \text{Equation (6)}$$

In Equation (6), beam_idx denotes a beam index estimated for the received power magnitude of the quantized signal, and Pi is calculated using Equation (7) below.

$$P_i[n] = P_i[n-1] + |\hat{y}_i[n]|^2 - |y_i[n - L_{measurement}]|^2 \quad \text{Equation (7)}$$

In Equation (7), Pi[n] denotes the received power magnitude estimated for an nth sample of the signal received through the beam combination corresponding to beam combination index i on the time domain, and L_measurement denotes a window length for measuring the received power magnitude.

Thereafter, in step 412, it is determined whether the index of the estimated beam combination is K. When the index of the estimated beam combination is determined to be smaller than K based on the result of the identification, the process returns to step 408. When the index of the estimated beam combination is the same as K based on the result of the identification, the transmission side ends the operation of FIG. 4A.

Meanwhile, channel capacity in the SISO-based communication system may be indicated using an SNR of a reception signal as shown in Equation (8) below.

$$C = \log_2(1 + \text{SNR}) \quad \text{Equation (8)}$$

In Equation (8), a Signal-to-Noise Ratio (SNR) may be indicated in consideration of quantization noise of the reception signal, as shown in Equation (9) below.

$$SNR \approx \frac{\sigma_y^2}{\sigma_w^2 + \sigma_Q^2} \qquad \text{Equation (9)}$$

In Equation (9), $\sigma_y^2$ denotes a signal component, $\sigma_w^2$ denotes a noise component, and $\sigma_Q^2$ denotes a quantization noise component. As Equation (9) above, the quantization noise of the reception signal influences the SNR and the channel capacity is expressed as an increasing function for the SNR. However, the quantization noise does not influence the estimation of the SISO-based optimal beam combination index, as shown in Equation (7).

Based on a comparison therewith, as shown in Equation (10) below, it is noted that channel capacity in the MIMO-based communication system should consider a channel rank, which is not considered when channel capacity in the SISO-based communication system is calculated.

$$C = \log_2 \det\left(I + \frac{E_x}{N_T N_0} HH^H\right) \qquad \text{Equation (10)}$$

In Equation (10), I denotes an identity matrix of NR×NR, $$\frac{E_x}{N_T}$$

denotes transmission power, N0 denotes noise, and H denotes a channel gain matric of NR×NT. NR denotes the number of reception antennas and NT denotes the number of transmission antennas.

Figure 5:
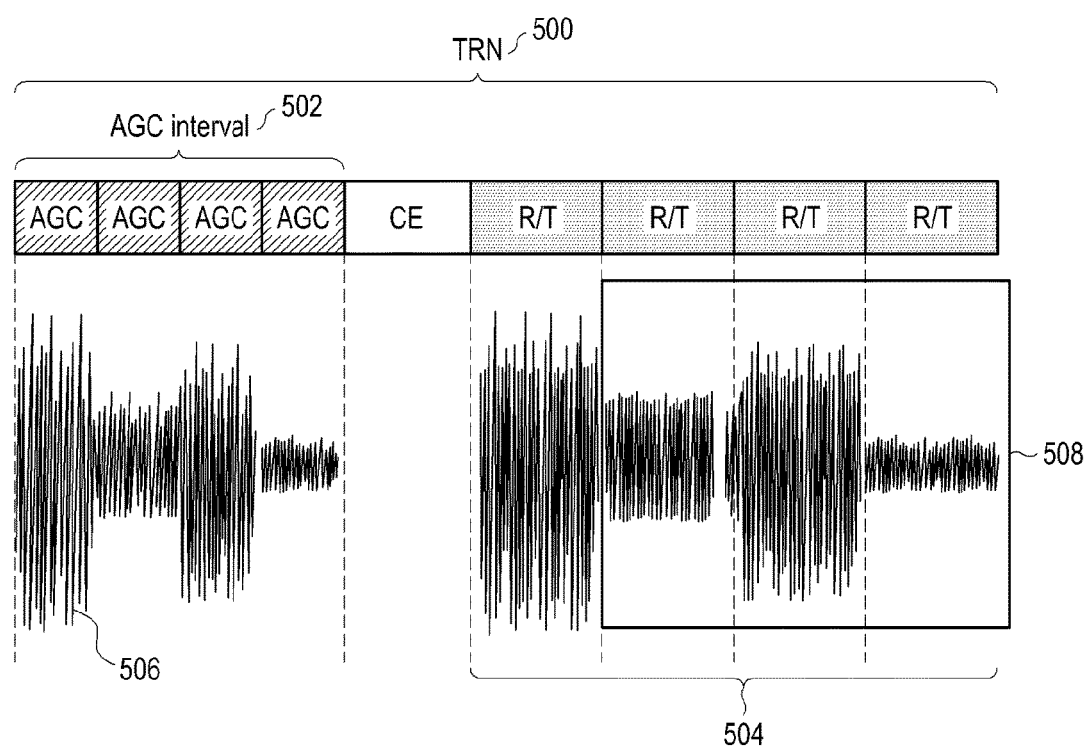
FIG. 5 illustrates an example of a quantization process when different sizes of signals are received in the SISO-based communication system.

FIG. 5 illustrates an example of a quantization process when different sizes of signals are received in the SISO-based communication system.

Referring to FIG. 5, a TRN interval 500 of a SISO-based packet includes, for example, an AGC interval 502 including subfields corresponding to a total of four beam combinations and a TRN unit 504 including TRN subfields corresponding to a total of four beam combinations. In this case, it is assumed that the magnitudes of reception power of the received signal in the four TRN subfields included in the TRN unit 504 are different. Further, it is assumed that the magnitude of reception power of a first signal received through a beam combination corresponding to beam index #1 has a maximum value but that a rank of the first signal is close to 1 among the signals received through a total of four beam combinations. Also, it is assumed that the magnitude of reception power of a third signal received through a beam combination corresponding to beam index #3 is smaller than the magnitude of reception power of the first signal, but the rank of the third signal is higher than 1. In this case, the AGC gain calculated by Equation (3) above is applied to the remaining signal reception intervals based on the reception power magnitude 506 of the first signal having the maximum value. Accordingly, as AGC gains different from the reception power magnitude of the corresponding signal are applied to signals received through beam combinations corresponding to beam combination indexes #2 to #4, quantization noise may be generated, as indicated by reference numeral 508.

As shown in Equation (10) above, in order to acquire MIMO-based channel capacity, a channel gain matrix is used, so that channel estimation for each corresponding beam combination should be performed first. For example, a channel estimation value of the beam combination corresponding to the beam combination index i may be calculated based on Equation (11) below.

$$\hat{H}_i(k) = H_i(k) + W_i(k) + N_{i,Q}(k) \qquad \text{Equation (11)}$$

In Equation (11), $\hat{H}_i(k)$ denotes a channel estimation value in a kth subchannel for the beam combination index i, Hi(k) denotes an actual channel in the kth subchannel for the beam combination index i, Wi(k) denotes noise, and Ni,Q(k) denotes quantization noise. As shown in Equation (11), when MIMO-based channel capacity is calculated, it is difficult to accurately measure channel capacity due to quantization noise. Further, in each beam combination, while average noise Wi(k) is the same, respective Ni,Q(k) have different effects, so the measurement of channel capacity may not be fair for each beam combination.

Figure 6:
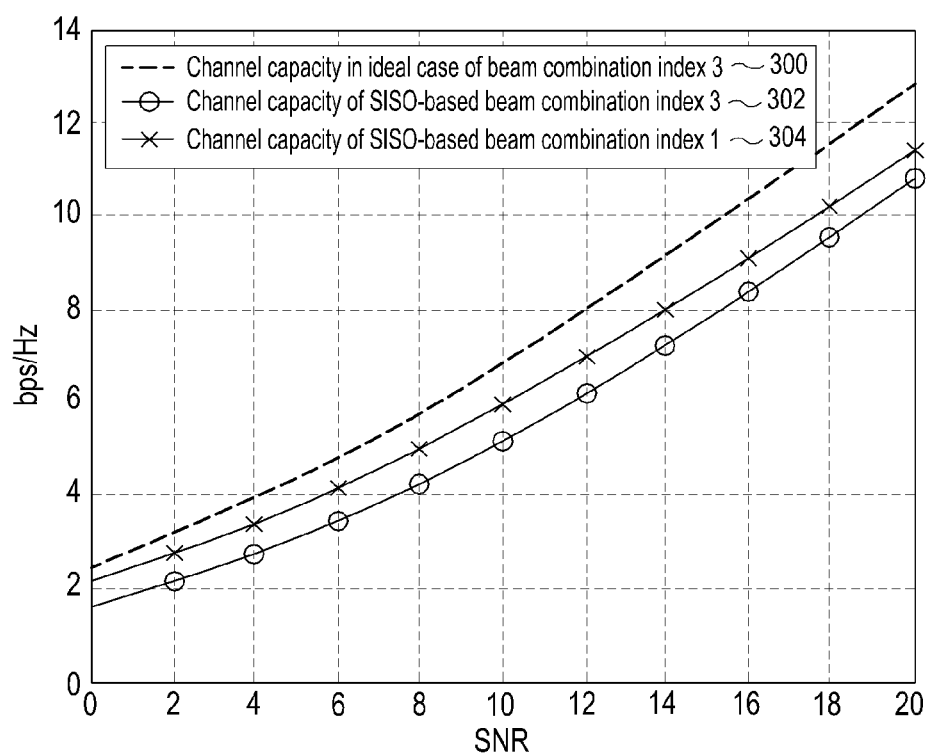
FIG. 6 illustrates an example of a resultant graph when the SISO-based packet structure is used for measuring MIMO channel capacity.

FIG. 6 illustrates an example of a resultant graph when the SISO-based packet structure is used for measuring MIMO channel capacity.

Referring to FIG. 6, in the embodiment of FIG. 5, the actual channel capacity 602 in beam combination #3 has a lower value than the maximum channel capacity 600 that can be acquired in beam combination index #3 having a rank higher than 1.

Accordingly, an embodiment of the present disclosure proposes a method of performing AGC on each beam combination in the existing SISO-based TRN structure.

Figure 7A:
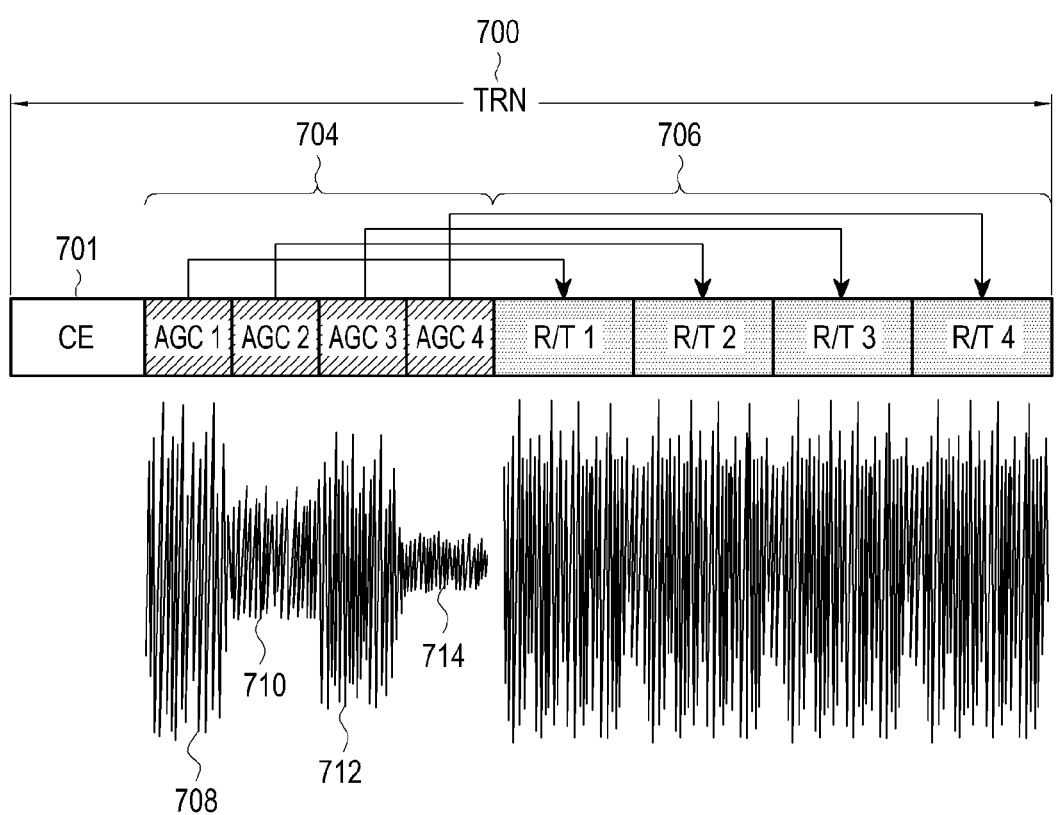
FIG. 7A illustrates an example of a packet structure in which AGC is performed on each beam combination based on the SISO-based TRN structure according to an embodiment of the present disclosure.

FIG. 7A illustrates an example of a packet structure in which AGC is performed on each beam combination based on the SISO-based TRN structure according to an embodiment of the present disclosure.

Referring to FIG. 7A, it is assumed that, for example, a TRN interval 700 is applied to a MIMO channel including a total of two antennas including a transmission antenna and a reception antenna. In this case, the TRN interval 700 may include a CE field 701, an AGC interval 704 in which AGC is performed on each of four transmission/reception beam combinations constituting the MIMO channel, and a beam-training interval 706 including TRN subfields for respective beam combinations.

Figure 7B:
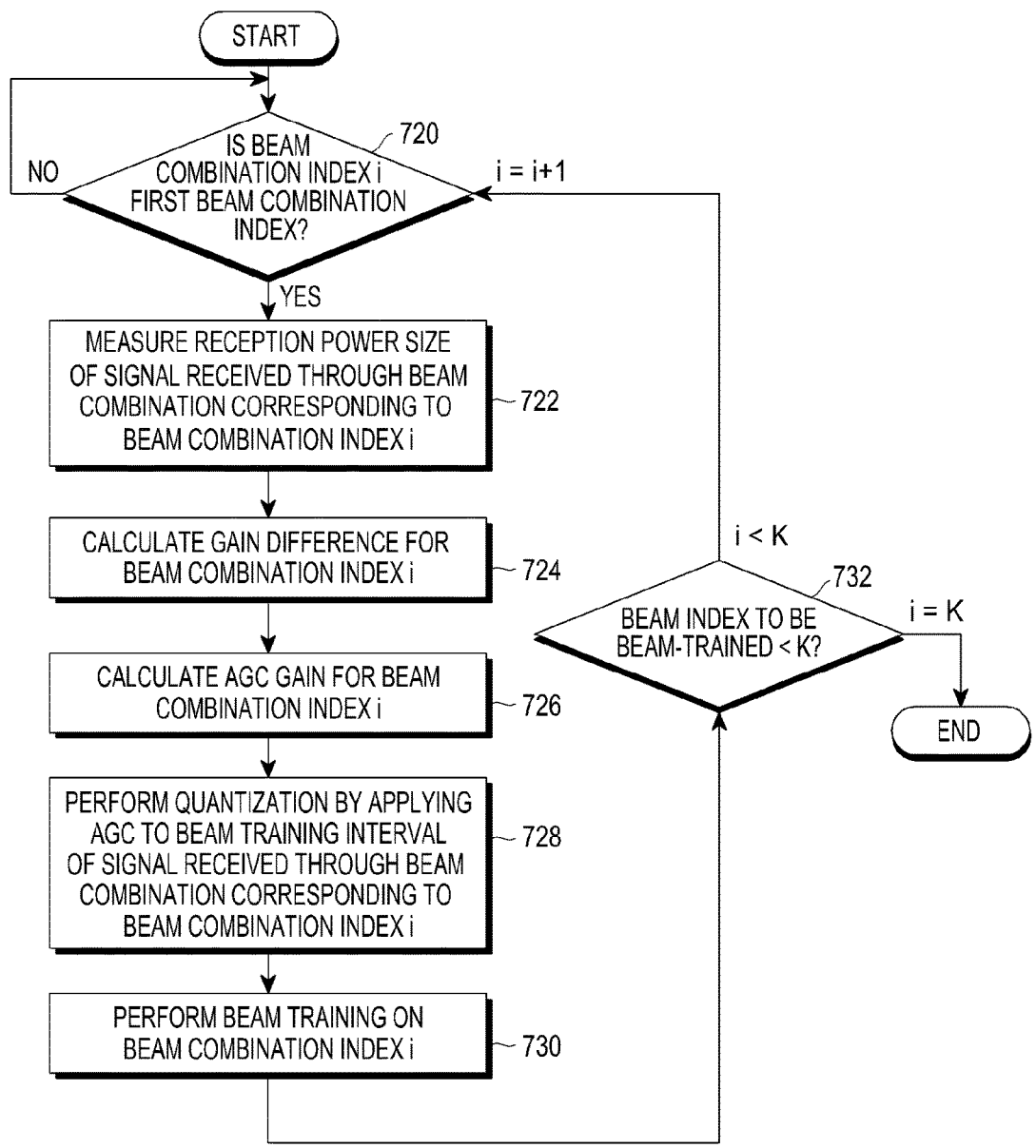
FIG. 7B is an example of a flowchart illustrating an operation in which beam training is performed based on a TRN interval of FIG. 7A according to an embodiment of the present disclosure.

FIG. 7B is an example of a flowchart illustrating an operation in which beam training is performed based on the TRN interval of FIG. 7A according to an embodiment of the present disclosure. For convenience of description, it is assumed that the transmission side determines an optimal reception beam through the beam training of FIG. 7B.

Referring to FIG. 7B, a first beam combination index i is identified in step 720, and the reception power magnitude of a signal received through a beam combination corresponding to the beam combination index i is measured in step 722. For example, the reception power magnitude of the signal received through the beam combination corresponding to the beam combination index i may be expressed by Equation (1) above. Further, by subtracting a gain value of the beam combination index i from a predetermined gain value GPre based on Equation (12) below, a gain difference of GPre is calculated in step 724.

$$\Delta G_i = G_{pre} - 10 \log_{10}(P_i) \qquad \text{Equation (12)}$$

In Equation (12), $\Delta G_i$ denotes a gain difference of the beam combination corresponding to the beam combination index i for GPre. In step 726, the transmission side calculates an AGC gain of the beam combination corresponding to the beam combination index i based on the gain difference for GPre based on Equation (13) below.

$$G_{AGC}^i[t] = G_{AGC}^i[t-1] + \Delta G_i \qquad \text{Equation (13)}$$

In Equation (13), $G_{AGC}^i[t]$ denotes an AGC gain when a tth packet is received through the beam combination corresponding to the beam combination index i on a time domain. In step 728, based on the AGC gain of the beam combination corresponding to the beam combination index i of the tth packet estimated through Equation (13) above, the signal received through the beam combination is quantized through Equation (5) above. Thereafter, in step 730, the transmission side performs beam training on the quantized received signal of the beam combination. That is, the transmission side measures the reception power magnitude of the quantized signal and estimates a beam combination of a beam index corresponding to the measured reception power magnitude as an optimal beam combination, as shown in Equation (6) above. In step 732, it is determined whether the beam combination index corresponding to the signal on which the beam training has been performed is K. When the beam combination index is determined to be K based on the result of the identification, the operation of FIG. 7B ends. When the beam combination index i is determined to be smaller than K based on the result of the identification, the transmission side returns to step 720 and performs the operations of FIG. 7B on the next beam combination index.

As described above, in the embodiment of FIGS. 7A and 7B, as the signal received through the corresponding beam combination is quantized using AGC gains 708 to 714, which are calculated differently for beam combinations, quantization noise generated after the quantization of the received signal of each beam combination is reduced, as shown in the graph of FIG. 7A. Accordingly, the estimated channel in the beam-training interval for each beam combination may be as shown in Equation (14) below.

$$\hat{H}_i(k) = H_i(k) + W_i(k) + \hat{N}_{i,Q}(k) \qquad \text{Equation (14)}$$

In Equation (14), the relationship between $\hat{N}_{i,Q}(k)$ and quantization noise $N_{i,q}(k)$ in Equation (11) may be as shown in Equation (15) below.

$$\hat{N}_{1,Q}(k) = N_{1,Q}(k)$$

$$\hat{N}_{i,Q}(k) \ll N_{i,Q}(k), i=2,\ldots,4 \qquad \text{Equation (15)}$$

That is, as shown in Equation (15) above, the quantization noise $\hat{N}_{i,Q}(k)$ according to an embodiment of the present disclosure may be more minimized than the quantization noise generated when SISO-based channel capacity is measured for each transmission beam. Accordingly, in an embodiment of the present disclosure, it is possible to select an optimal beam combination considering quantization noise for the MIMO channel by proposing an Advanced TRN (A-TRN) structure, which is expanded from the SISO-based TRN structure and which may efficiently calculate the AGC gain for each beam combination.

Figure 8:
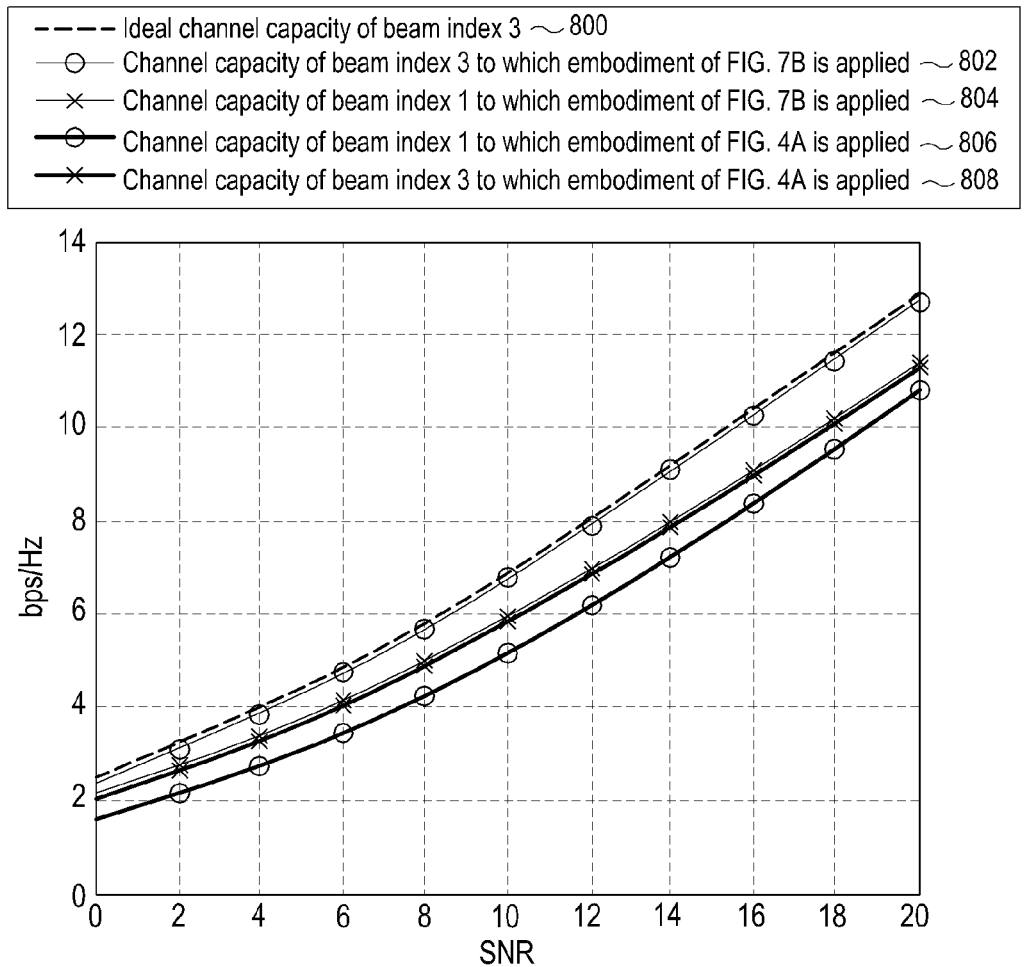
FIG. 8 illustrates an example of channel capacity for a MIMO channel to which beam training is applied according to the embodiment of FIGS. 7A and 7B.

FIG. 8 illustrates an example of channel capacity for a MIMO channel to which beam training is applied according the embodiment of FIGS. 7A and 7B.

Referring to FIG. 8, the channel capacity 802 of beam combination index #3, to which the embodiment of FIGS. 7A and 7B is applied, may be closer to the ideal channel capacity of beam combination index #3 based on a comparison with channel capacity 808 of beam combination index #3, to which the embodiment of FIG. 4A is applied.

According to the embodiment of FIGS. 7A and 7B, the transmission side may select an optimal beam combination through beam training of the A-TRN interval and feed back the index of the selected beam combination to the reception side. Here, the index of the beam combination may be included in channel measurement feedback information used in the SISO-based communication system of FIG. 9.

Referring to FIG. 9, a channel estimation value measured for each subfield, corresponding to a beam combination included in the A-TRN interval among channel measurement feedback information, and a relative channel estimation value for a currently set serving beam combination in the case of tap delay information should be fed back. However, when the AGC gain is calculated for each beam combination according to the embodiment of FIGS. 7A and 7B, the AGC gain of the serving beam combination is different from the AGC gain for each beam combination, so that a channel value in the candidate beam combination to be trained cannot be expressed as a relative value based on a comparison with a channel value in the current serving beam combination. Accordingly, another embodiment of the present disclosure proposes a method of correctly measuring relative values of AGC gain values between the serving beam combination and the corresponding candidate beam combination.

Figure 10A:
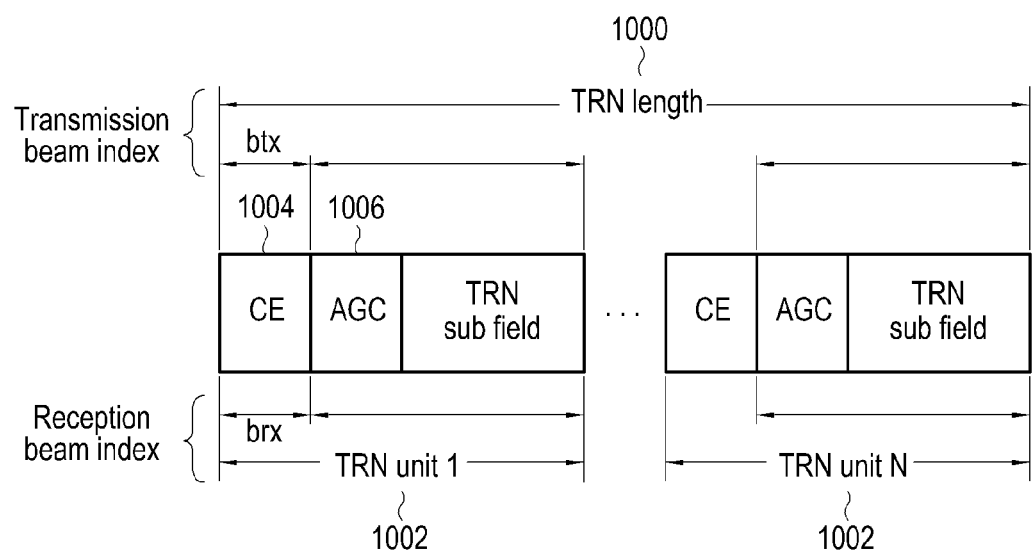
FIG. 10A illustrates an example of the TRN structure according to another embodiment of the present disclosure.

FIG. 10A illustrates an example of the A-TRN structure according to another embodiment of the present disclosure.

Referring to FIG. 10A, an A-TRN structure 1000 according to an embodiment of the present disclosure includes a TRN unit mapped to each of supportable beam combinations in one-to-on correspondence. For convenience of description, FIG. 10A assumes that there are TRN units corresponding to a total of N beam combinations within the TRN structure 1000.

Further, each TRN unit according to an embodiment of the present disclosure includes one CE field, an AGC interval, and a TRN subfield in order to minimize a quantization error. A CE field 1004 is an interval in which a channel corresponding to a currently served serving beam combination is measured. In FIG. 10A, btx and brx denote indexes of a transmission beam and a reception beam included in the serving beam combination, respectively. The AGC interval included in each TRN unit is an interval for measuring an AGC gain of a candidate beam combination corresponding to the corresponding TRN unit, and the TRN subfield is an interval for performing beam training of the candidate beam combination and channel measurement. t1, . . . , tN denote indexes of the transmission beam mapped to respective TRN units, and r1, . . . , rN denotes indexes of the reception beam mapped to respective TRN units.

For convenience of description, it is assumed that the transmission side selects an optimal beam combination. Then, the transmission side measures a channel corresponding to a current serving beam combination through the CE field 1004 of TRN unit #1 1002. Further, the transmission side calculates an AGC gain for beam combination #1 mapped to TRN unit #1 1002 through the AGC interval 1006 and performs beam training of the corresponding candidate beam combination through the TRN subfield. Beam combination #1 includes a transmission beam t1 and a reception beam t2. Similarly, the AGC gain of the corresponding candidate beam combination is calculated and beam training is performed through the TRN unit corresponding to each of the remaining beam combinations. In the embodiment of FIG. 10A, the AGC gain of the candidate beam combination mapped to the corresponding TRN unit in the AGC interval may be acquired through a channel estimation block of FIG. 10B.

As illustrated in FIG. 10A, when the beam-training procedure is performed based on the A-TRN structure according to an embodiment of the present disclosure, a corresponding node transmits a flag indicating the operation based on the A-TRN structure to the reception side. Accordingly, the reception side may operate after identifying whether the packet received through the beam-training procedure has the A-TRN structure or the existing SISO-based structure according to whether or not the flag is received.

Figure 10B:
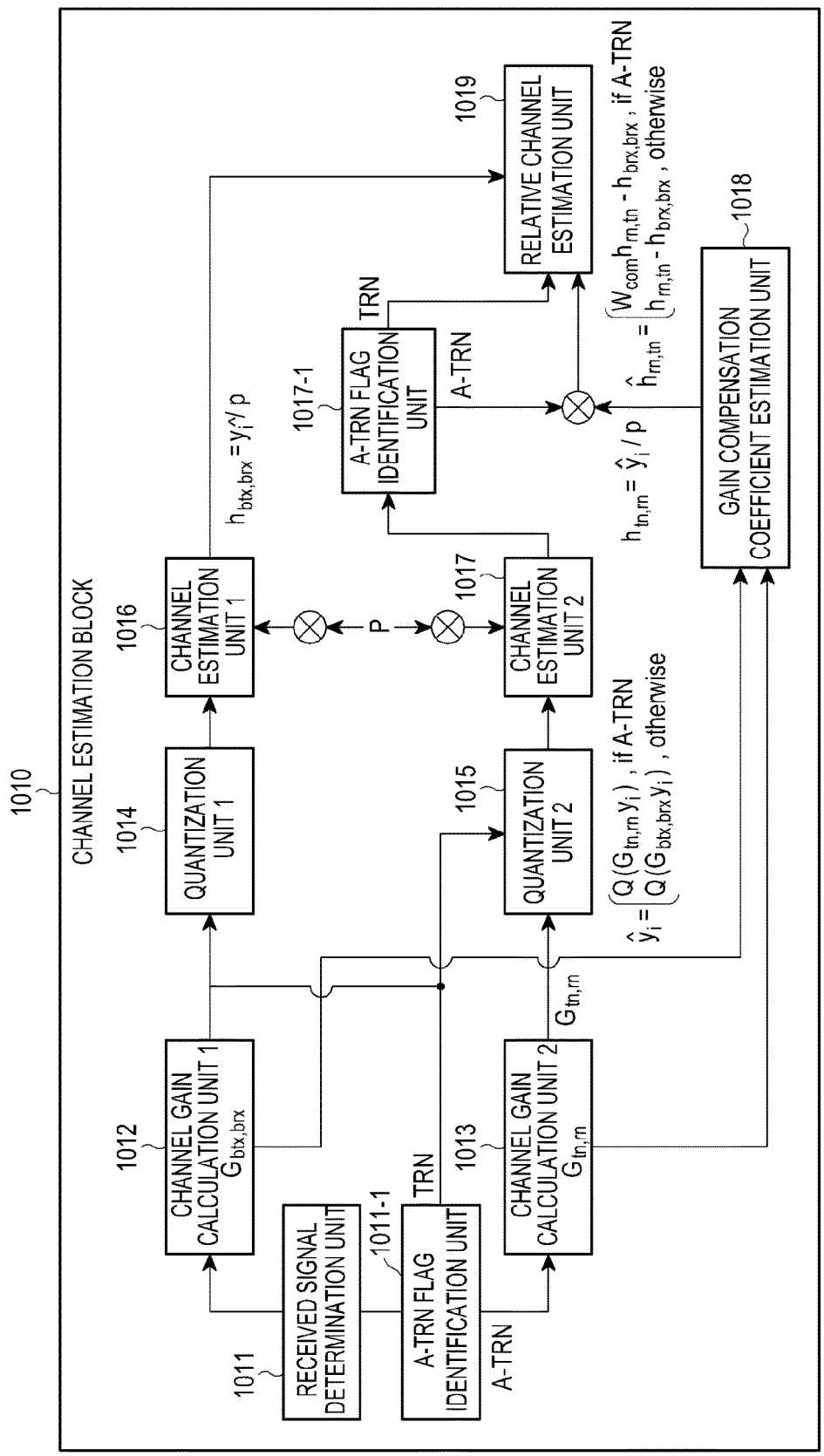
FIG. 10B illustrates an example of a channel measurement block operating based on the A-TRN structure of FIG. 10A.

FIG. 10B is an example of a block diagram illustrating the operation of performing channel estimation based on the A-TRN structure of FIG. 10A. The block configuration of FIG. 10B is only an example, and the subunits may be further subdivided, or may be integrated into one unit. Alternatively, the subunits may be included within a transmission node or a reception node to perform beam training for the MIMO channel.

Referring to FIG. 10B, for example, a channel estimation block 1010 may largely have two paths according to the result of identification by a received signal determination unit 1011 about whether an input signal indicates a CE field or a TRN field. First, when the corresponding received signal indicates a CE field, channel estimation of the signal received through a serving beam combination corresponding to the CE field is performed through channel gain calculation unit #1 1012, quantization unit #1 1014, and channel estimation unit #1 1016. Channel gain calculation unit #1 1012 calculates and stores an AGC gain Gbtx,brx of a signal received through a serving channel corresponding to the current serving beam combination and transmits the AGC gain Gbtx,brx to quantization unit #1 1014 and a gain compensation coefficient estimation unit 1018. Further, channel estimation unit #1 1016 estimates a serving channel value $h_{btx,brx} = \hat{y}_t/P$ based on the AGC gain of the serving combination (P being a pilot signal), and transmits the estimated value of the serving channel value to a relative channel estimation unit 1019.

When the received signal indicates the TRN field, an A-TRN flag identification unit 1011-1 additionally determines whether the corresponding TRN field is an A-TRN field or the existing SISO-based TRN field. As described above, the A-TRN flag identification unit 1011-1 determines whether the TRN field is the A-TRN field or the existing SISO-based TRN field based on whether there is an A-TRN flag received in a predetermined interval before the signal is received. When the TRN field is determined to be an A-TRN field based on a result of the determination, channel estimation corresponding to a signal received through a candidate beam combination corresponding to the TRN field first passes through a channel gain calculation unit #2 1013 and then a quantization unit #2 1015 and a channel estimation unit #2 1017, like the CE field.

More specifically, when the TRN field is determined to be an A-TRN field based on the result of the determination, the channel gain calculation unit #2 1013 calculates and stores an AGC gain Gtn,rn for each of the candidate beam combinations to be beam-trained and transmits the AGC gain Gtn,rn to quantization unit #2 1015 and the gain compensation coefficient estimation unit 1018. Subsequently, quantization unit #2 1015 quantizes the channel gain corresponding to the TRN field or the A-TRN field.

First, in the case of the existing TRN field, quantization unit #2 1015 performs quantization Q(Gbtx,brxyi) on the signal received through the candidate beam combination corresponding to the TRN field based on the AGC gain of the serving channel corresponding to the serving beam combination. Further, in the case of the A-TRN field, quantization unit #2 1015 performs quantization Q(Gtn,rmyi) on the signal received through a candidate beam combination corresponding to the A-TRN field based on the AGC gain of the corresponding candidate channel received from channel gain calculation unit #2 1013 and transmits the quantized signal to channel estimation unit #2 1017.

Meanwhile, the gain compensation coefficient estimation unit 1018 inputs the serving channel estimation value of the serving beam combination of the channel gain calculation unit #1 1012 and the candidate channel estimation value of the corresponding candidate beam combination of the channel gain calculation unit #2 1013. Then, the gain compensation coefficient estimation unit 1018 estimates a weight coefficient Wcom for compensating for a difference value between the channel estimation value of the serving beam combination and the channel estimation value of the candidate beam combination.

Channel estimation unit #2 1018 may estimate the candidate channel value $h_{m,m} = \hat{y}_t/P$ based on the AGC gain of the candidate channel and the pilot signal P. Channel estimation unit #2 1017 receives one of a quantization signal corresponding to the existing TRN field and a quantization signal corresponding to the A-TRN field through quantization unit #2 1015. Accordingly, the channel estimation value estimated by channel estimation unit #2 1017 is input into the A-TRN flag identification unit 1017-1. Then, the A-TRN flag identification unit 1017-1 determines again whether the channel estimation value is estimated based on the A-TRN field or the general TRN field of the quantization signal. When the quantization signal is determined to be based on the A-TRN field based on the result of the determination, the weight coefficient output from the gain coefficient estimation unit 1018 is multiplied by the candidate channel estimation value and then output to the channel estimation unit 1019. When the quantization signal is determined to be the candidate channel estimation value based on the existing TRN field based on the result of the determination, the candidate channel estimation value is directly transmitted to the relative channel estimation unit 1019. Then, the relative channel estimation unit 1019 calculates a relative channel estimation value $\hat{h}_{rn,m}$ of the candidate channel corresponding to the corresponding TRN field. That is, in the case of the existing TRN field, the relative channel estimation unit 1019 acquires a relative channel estimation value by subtracting the serving channel estimation value from the candidate channel estimation value. In the case of the A-TRN field, the relative channel estimation unit 1019 acquires the relative channel estimation value by subtracting the serving channel estimation value from the result of multiplication of the candidate channel estimation value by the weight coefficient Wcom.

Figure 11A:
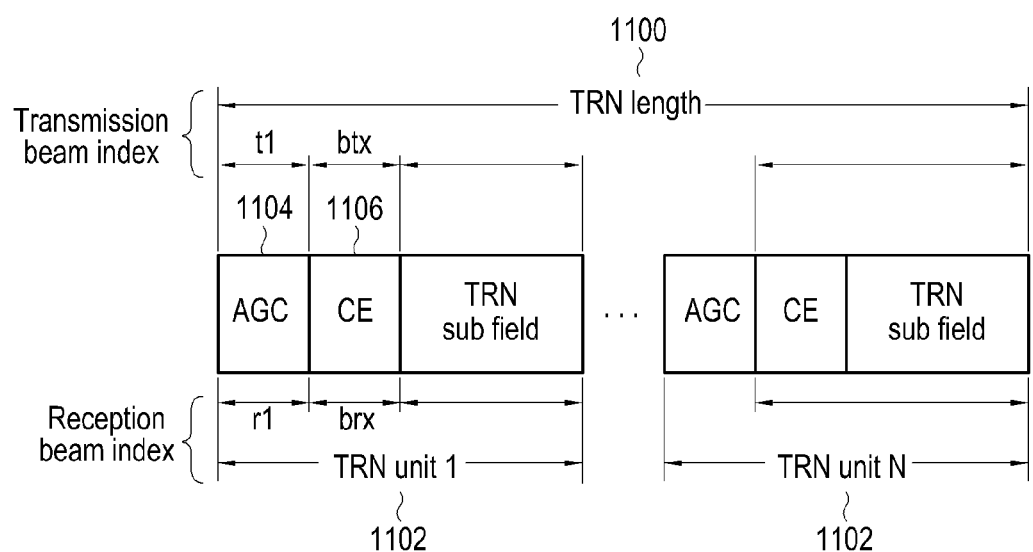
FIG. 11A illustrates another example of the A-TRN structure according to another embodiment of the present disclosure.

FIG. 11A illustrates another example of the A-TRN structure according to another embodiment of the present disclosure.

In a TRN field 1100 according to an embodiment of FIG. 11A, locations of a CE field and an AGC interval included in each TRN unit within the TRN field 1100 are different from the structure of the TRN field 1000 of FIG. 10A. For example, in TRN unit #1 1102, an AGC interval 1104 is located before a CE field 1106. Accordingly, the AGC interval and the TRN subfield are successively arranged in each TRN unit according to the embodiment of FIG. 10A, so that beam switching does not occur within the same TRN unit. On the other hand, in the TRN unit according to the embodiment of FIG. 11A, the CE field is arranged between the AGC interval and the TRN subfield, so that beam switching occurs three times within the same TRN unit.

Figure 11B:
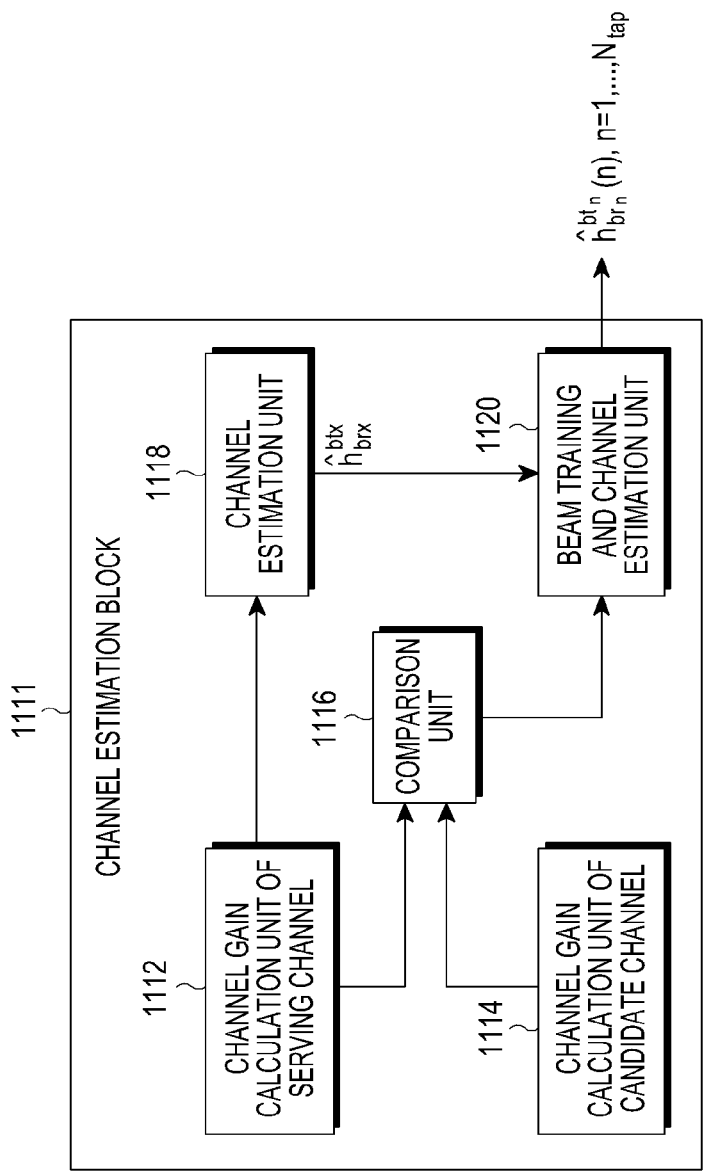
FIG. 11B illustrates an example of a channel measurement block operating based on the A-TRN structure of FIG. 11A.

FIG. 11B is an example of a channel measurement block operating based on the TRN structure of FIG. 11A. The channel measurement block may be included in a transmission node or a reception node to perform beam training on the MIMO channel.

Referring to FIG. 11B, a channel estimation block 1111 according to an embodiment of the present disclosure may include, for example, a channel gain calculation unit 1112 of a serving channel, a channel gain calculation unit 1114 of a candidate channel, a comparison unit 1116, a channel estimation unit 1118, and a beam training and channel estimation unit 1120. The block configuration of FIG. 11B is only an example, and the subunits may be further subdivided, or may be integrated into one unit.

The channel gain calculation unit 112 of the serving channel estimates in advance and stores an AGC gain for the serving channel. The AGC gain of the serving channel may be estimated, for example, through an SFT 102 corresponding to a preamble in the packet structure of FIG. 1. Further, the channel gain calculation unit 114 of the candidate channel calculates an AGC gain of a candidate beam combination corresponding to each TRN unit and transmits the AGC gain to the comparison unit 1116.

Then, the comparison unit 1116 compares the AGC gain of the serving channel and the AGC gain of the corresponding candidate beam, selects a maximum value therebetween, and transmits the selected maximum value to the channel estimation unit 1118 and the beam training and channel estimation unit 1120. Then, the channel estimation unit 1118 and the beam training and channel estimation unit 1120 may perform beam training by applying channel estimation and quantization based on the maximum value, thereby preventing the signal received by the corresponding TRN unit from being saturated. In this case, a quantization error may occur, but performance deterioration generated by the quantization error is not significant since the signal of the current serving combination is compared only with the signal of the corresponding candidate combination. Further, the beam training and channel estimation unit 1120 may estimate a relative channel estimation value by comparing the channel estimation value of the serving combination from the channel estimation unit 118 with the channel estimation value for each candidate beam.

As the relative channel estimation value between the current serving beam combination and the corresponding candidate beam combination is acquired based on the embodiments of FIGS. 10A to 11B, the channel estimation value for the MIMO channel may be fed back based on the existing SISO-based channel measurement feedback information, as illustrated in FIG. 9.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the aforementioned embodiments, but should be defined by the appended claims and equivalents thereof.

The invention claimed is:

1. A method of estimating a channel by a transmission side in a communication system supporting Multiple-Input Multiple-Output (MIMO)-based beamforming, the method comprising:
    acquiring a candidate channel estimation value of each of a plurality of candidate beam combinations including at least one transmission beam and at least one reception beam among transmission beams of the transmission side and reception beams of a reception side, wherein a channel estimation interval corresponding to each of the plurality of candidate beam combinations includes a serving channel estimation interval corresponding to a serving beam combination of the transmission side and the reception side, a channel gain estimation interval of one of the plurality of candidate beam combinations, and a channel estimation interval of the one of the plurality of candidate beam combinations; and
    acquiring an optimal channel estimation value of the transmission side and the reception side based on the acquired candidate channel estimation values.

2. The method of claim 1, further comprising transmitting information indicating estimation of a channel estimation value based on a channel estimation interval corresponding to each of the plurality of candidate beam combinations to the reception side.

3. The method of claim 1, wherein the acquiring of the candidate channel estimation value of each of the plurality of candidate beam combinations comprises:
    acquiring a serving channel estimation value through a first serving channel estimation interval included in a first channel estimation interval corresponding to a first candidate beam combination among the plurality of candidate beam combinations;
    acquiring a first candidate channel estimation value of the first candidate beam combination through a first candidate channel estimation interval included in the first channel estimation interval; and
    acquiring a relative channel estimation value by subtracting the serving channel estimation value from the first candidate channel estimation value.

4. The method of claim 3, wherein the acquiring of the relative channel estimation value comprises multiplying the first candidate channel estimation value by a weight coefficient.

5. The method of claim 3, wherein the acquiring of the serving channel estimation value comprises:
    calculating a gain value of a signal received through a serving transmission beam and a serving reception beam included in the serving beam combination based on a difference value between a reference gain value and a maximum reception power value of all beam combinations; and
    acquiring and quantizing the serving channel estimation value based on the calculated gain value.

6. The method of claim 3, wherein the acquiring of the first candidate channel estimation value comprises:
    calculating a gain value of a signal received through a first candidate transmission beam and a first candidate reception beam included in the first candidate beam combination based on a difference value between a reference gain value and a maximum reception power value of all beam combinations; and
    acquiring and quantizing the first candidate channel estimation value based on the calculated gain value.

7. The method of claim 1, wherein the channel estimation interval corresponding to each of the plurality of candidate beam combinations sequentially includes the serving channel estimation interval, a channel gain estimation interval of a corresponding candidate beam combination, and the channel estimation interval of the corresponding candidate beam combination.

8. The method of claim 1, wherein the channel estimation interval corresponding to each of the plurality of candidate beam combinations sequentially includes the serving channel estimation interval and the channel estimation interval of a respective candidate beam combination.

9. A transmission side for estimating a channel in a communication system supporting Multiple-Input Multiple-Output (MIMO)-based beamforming, the transmission side comprising:
  a first channel estimation processor configured to acquire a candidate channel estimation value of each of a plurality of candidate beam combinations including at least one transmission beam and at least one reception beam among transmission beams of the transmission side and reception beams of a reception side, wherein a channel estimation interval corresponding to each of the plurality of candidate beam combinations includes a serving channel estimation interval corresponding to a serving beam combination of the transmission side and the reception side, a channel gain estimation interval of one of the plurality of candidate beam combinations, and a channel estimation interval of the candidate beam combination; and
  a second channel estimation processor configured to acquire an optimal channel estimation value of the transmission side and the reception side based on the acquired candidate channel estimation values.

10. The transmission side of claim 9, further comprising a transmitter configured to transmit information indicating estimation of a channel estimation value based on a channel estimation interval corresponding to each of the plurality of candidate beam combinations to the reception side.

11. The transmission side of claim 9, wherein the first channel estimation processor comprises:
  a serving channel estimation processor configured to acquire a serving channel estimation value through a first serving channel estimation interval included in a first channel estimation interval corresponding to a first candidate beam combination among the plurality of candidate beam combinations; and
  a candidate channel estimation processor configured to acquire a first candidate channel estimation value of the first candidate beam combination through a first candidate channel estimation interval included in the first channel estimation interval, and
  the second channel estimation processor acquires a relative channel estimation value by subtracting the serving channel estimation value from the first candidate channel estimation value.

12. The transmission side of claim 11, wherein the second channel estimation processor multiplies the first candidate channel estimation value by a weight coefficient when calculating the relative channel estimation value.

13. The transmission side of claim 11, wherein, when the serving channel estimation processor calculates a gain value of a signal received through a serving transmission beam and a serving reception beam included in the serving beam combination based on a difference value between a reference gain value and a maximum reception power value of all beam combinations and transmits the calculated gain value to a quantization processor, the quantization processor acquires and quantizes the serving channel estimation value based on the calculated gain value.

14. The transmission side of claim 11, wherein, when the candidate channel estimation processor calculates a gain value of a signal received through a first candidate transmission beam and a first candidate reception beam included in the first candidate beam combination based on a difference value between a reference gain value and a maximum reception power value of all beam combination and transmits the calculated gain value to a quantization processor, the quantization processor acquires and quantizes the first candidate channel estimation value based on the calculated gain value.

15. The transmission side of claim 11, wherein the channel estimation interval corresponding to each of the plurality of candidate beam combinations sequentially includes the serving channel estimation interval, a channel gain estimation interval of a corresponding candidate beam combination, and the channel estimation interval of the corresponding candidate beam combination, or sequentially includes the channel gain estimation interval of the corresponding candidate beam combination, the serving channel estimation interval, and the channel estimation interval of the corresponding candidate beam combination.

* * * * *